Jan. 28, 1964  T. L. SPEER  3,119,257
TRAFFIC SIMULATOR APPARATUS
Filed March 2, 1960  7 Sheets-Sheet 1
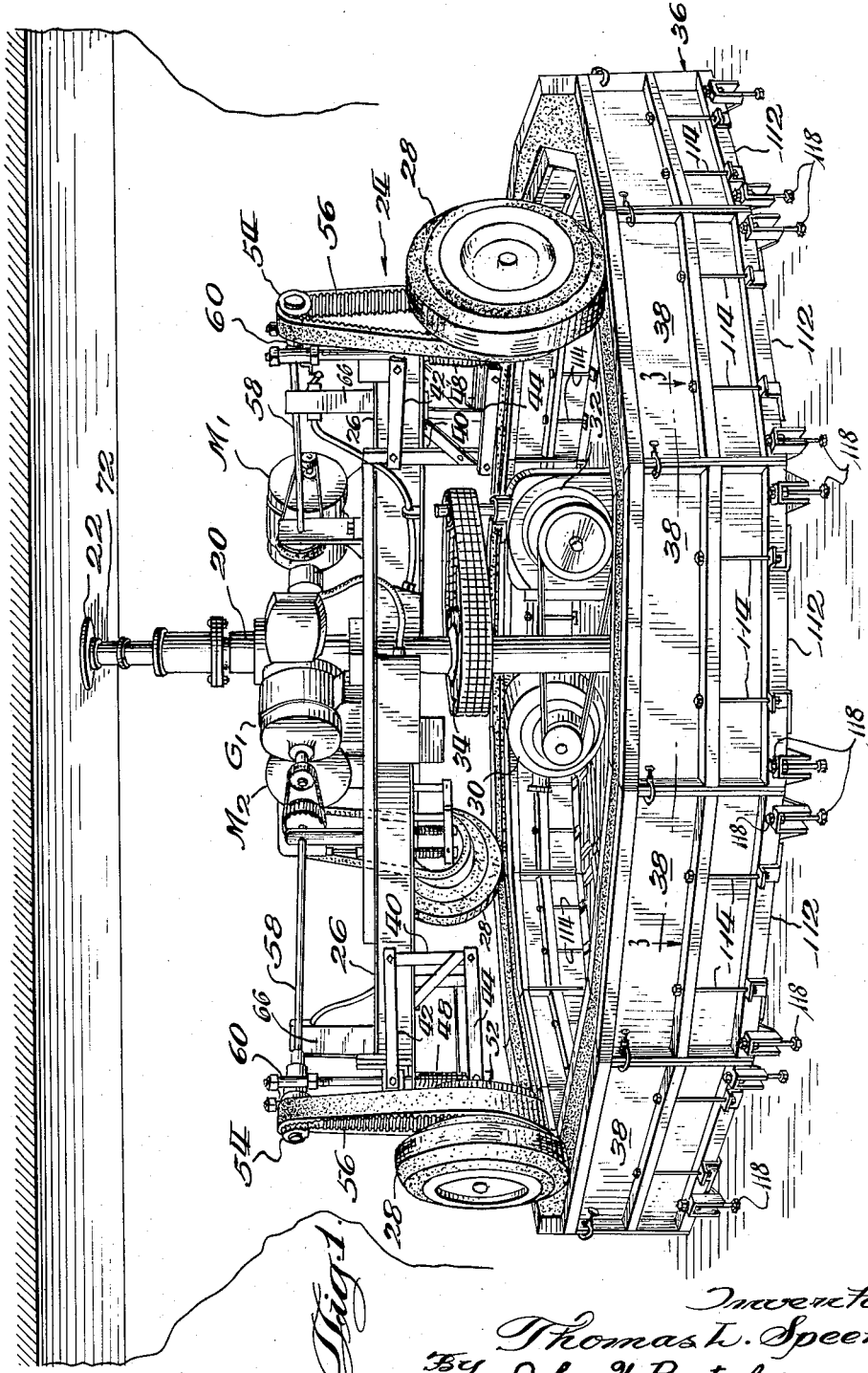

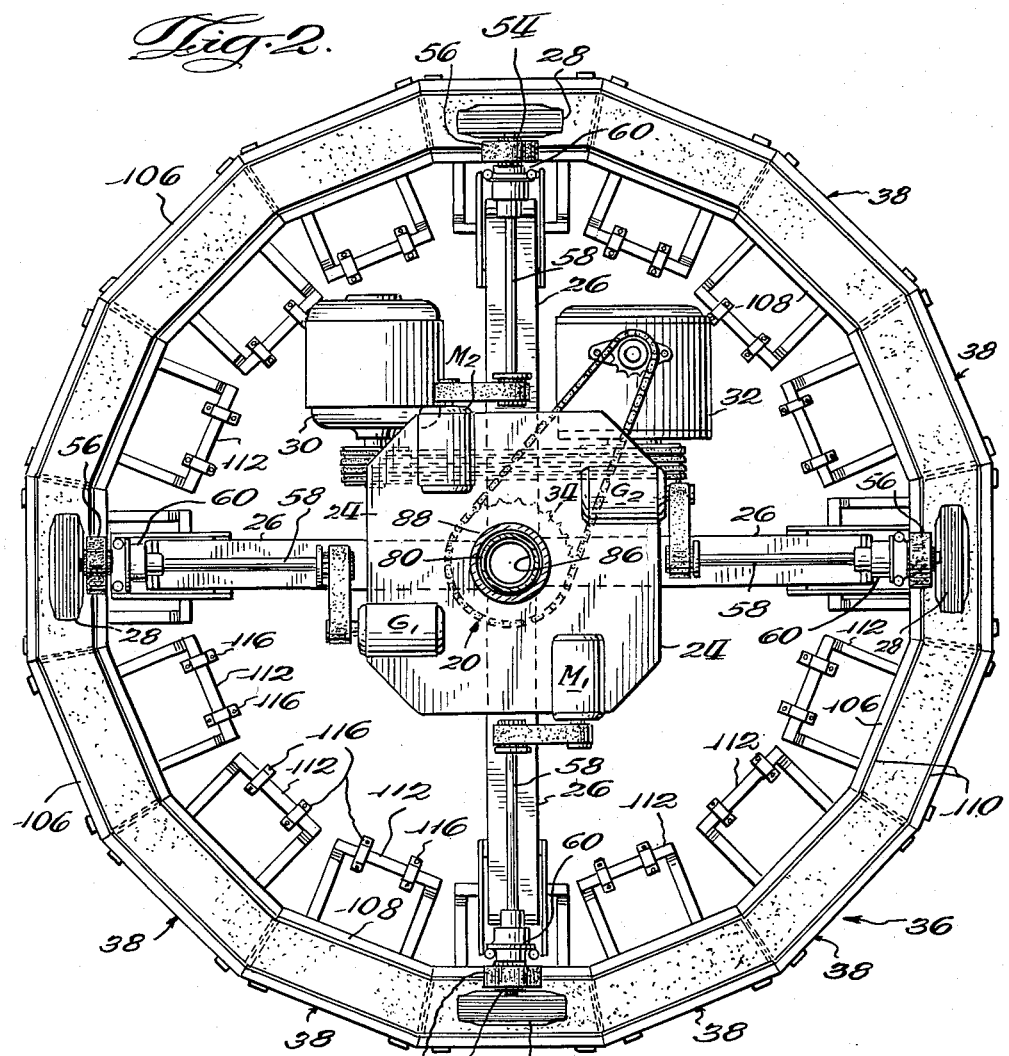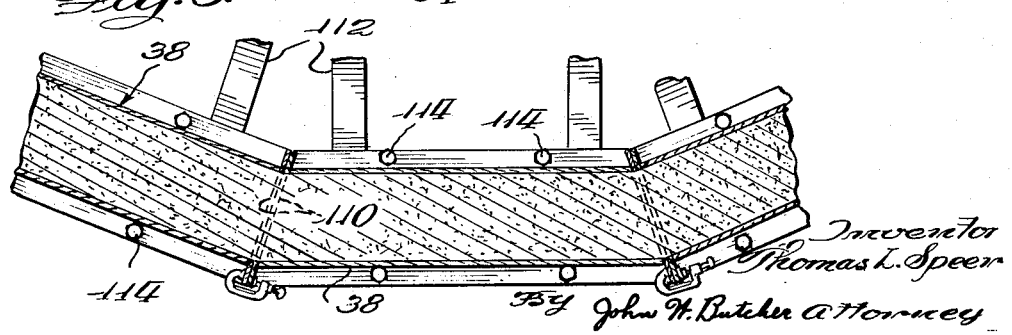

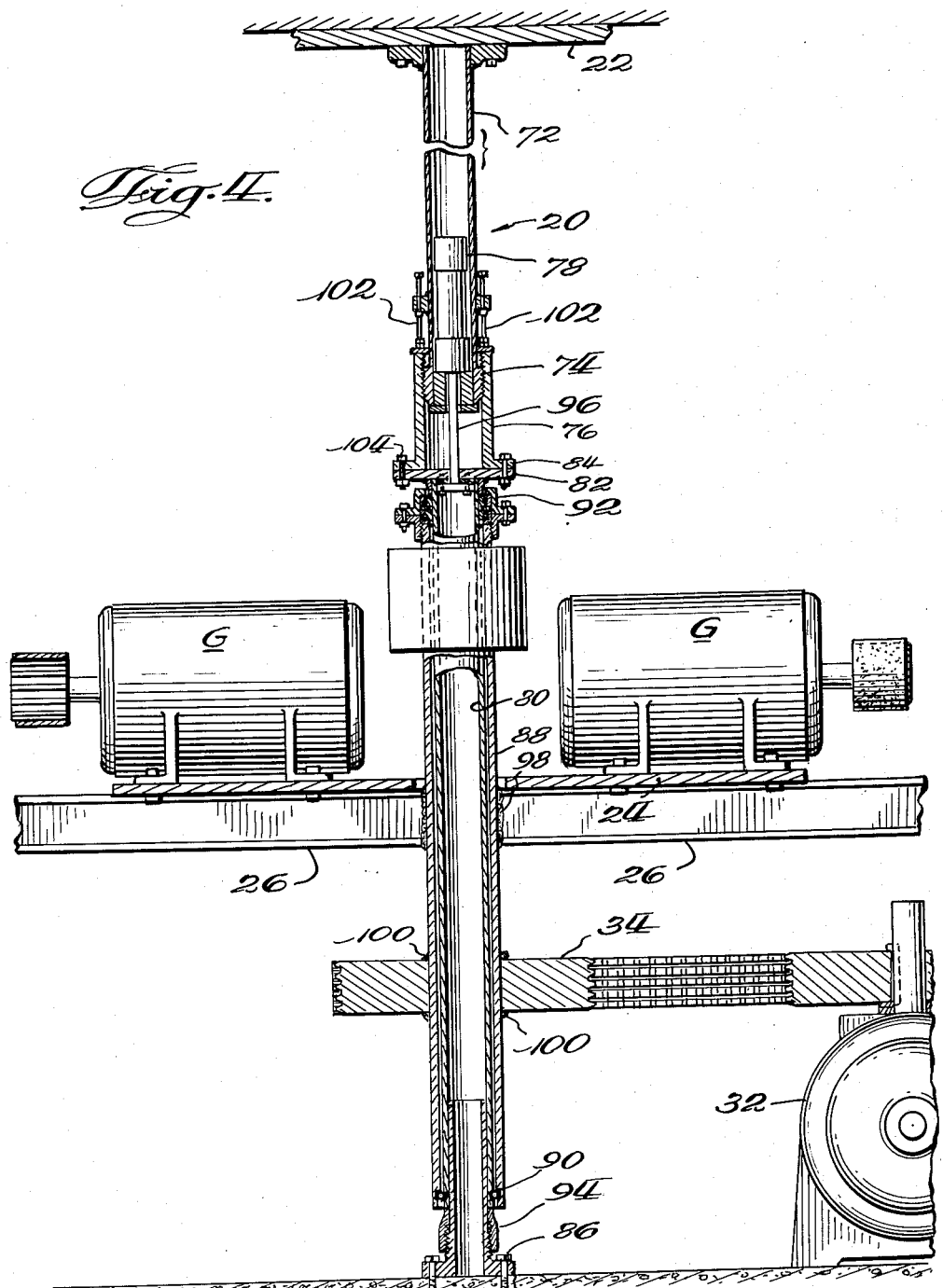

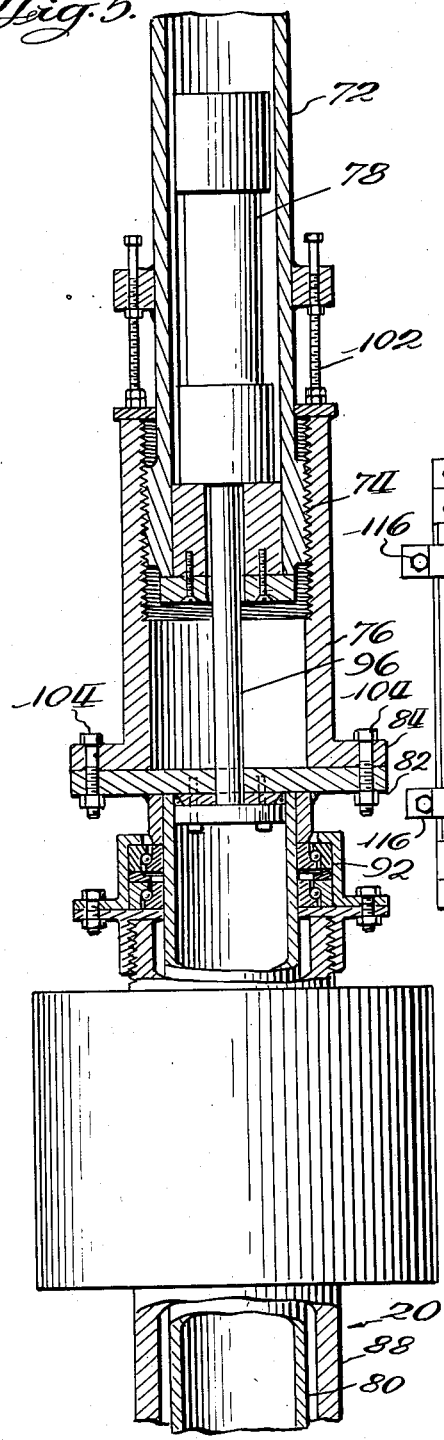
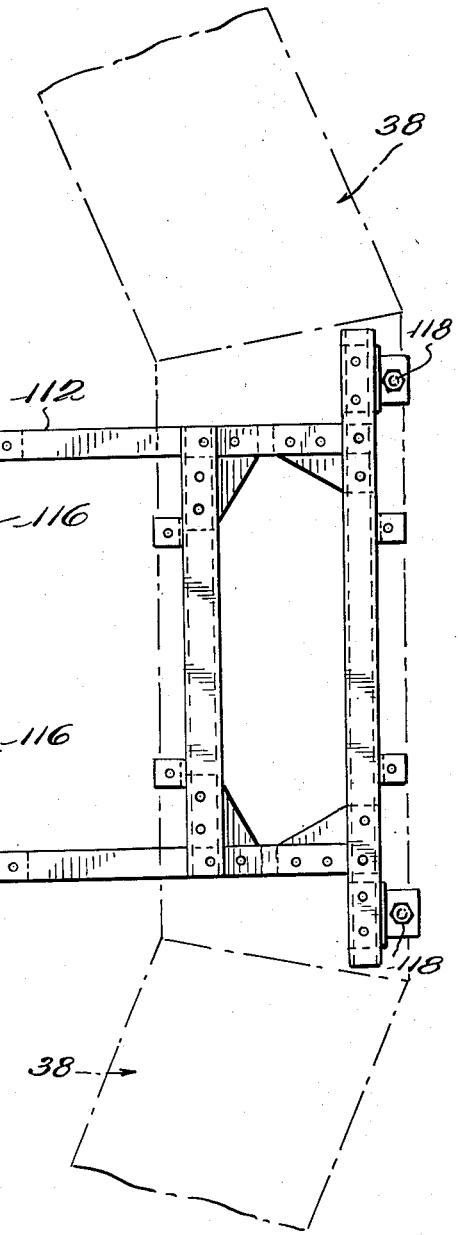

Jan. 28, 1964 T. L. SPEER 3,119,257
TRAFFIC SIMULATOR APPARATUS
Filed March 2, 1960 7 Sheets-Sheet 5

Inventor
Thomas L. Speer
By John W. Butcher
Attorney

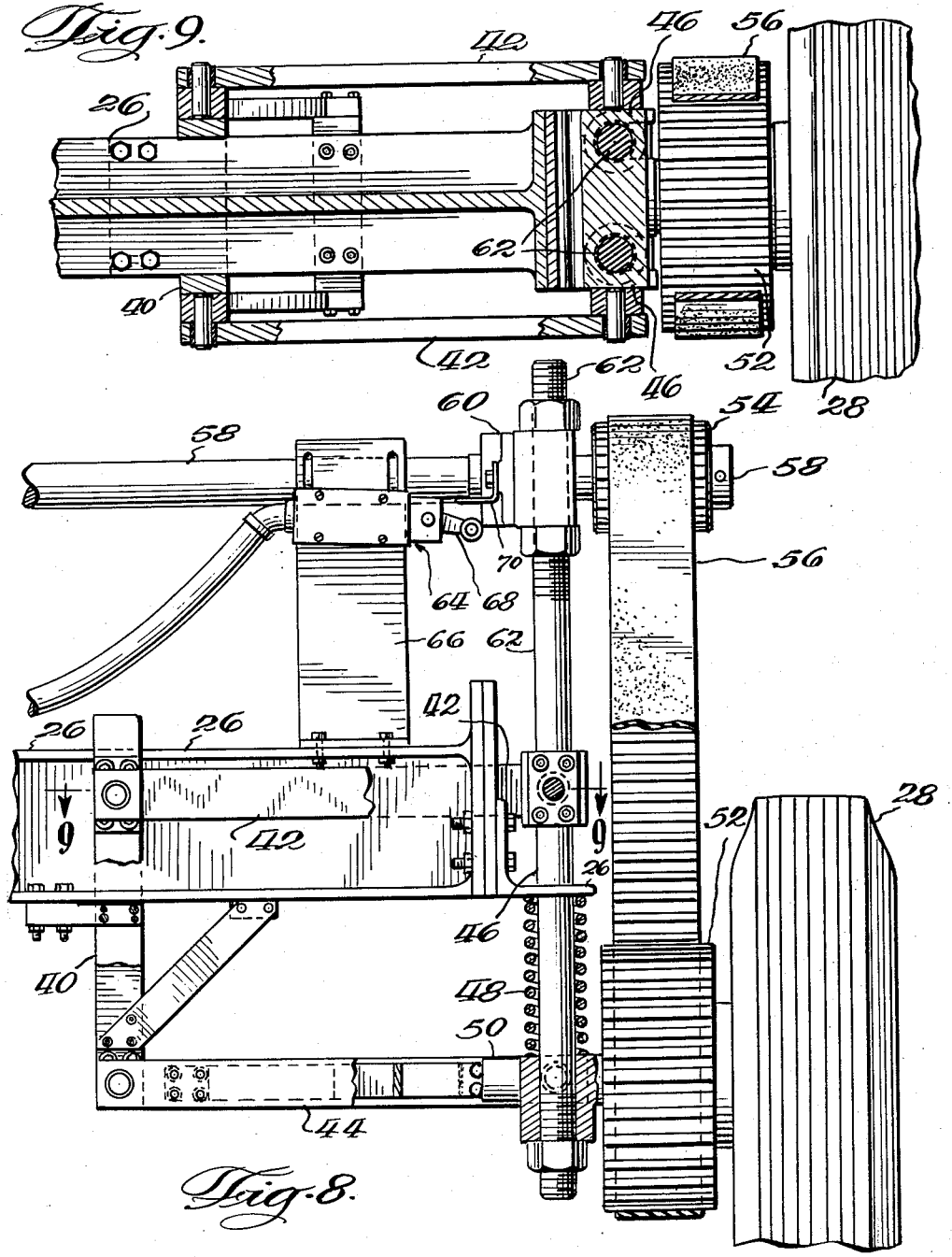

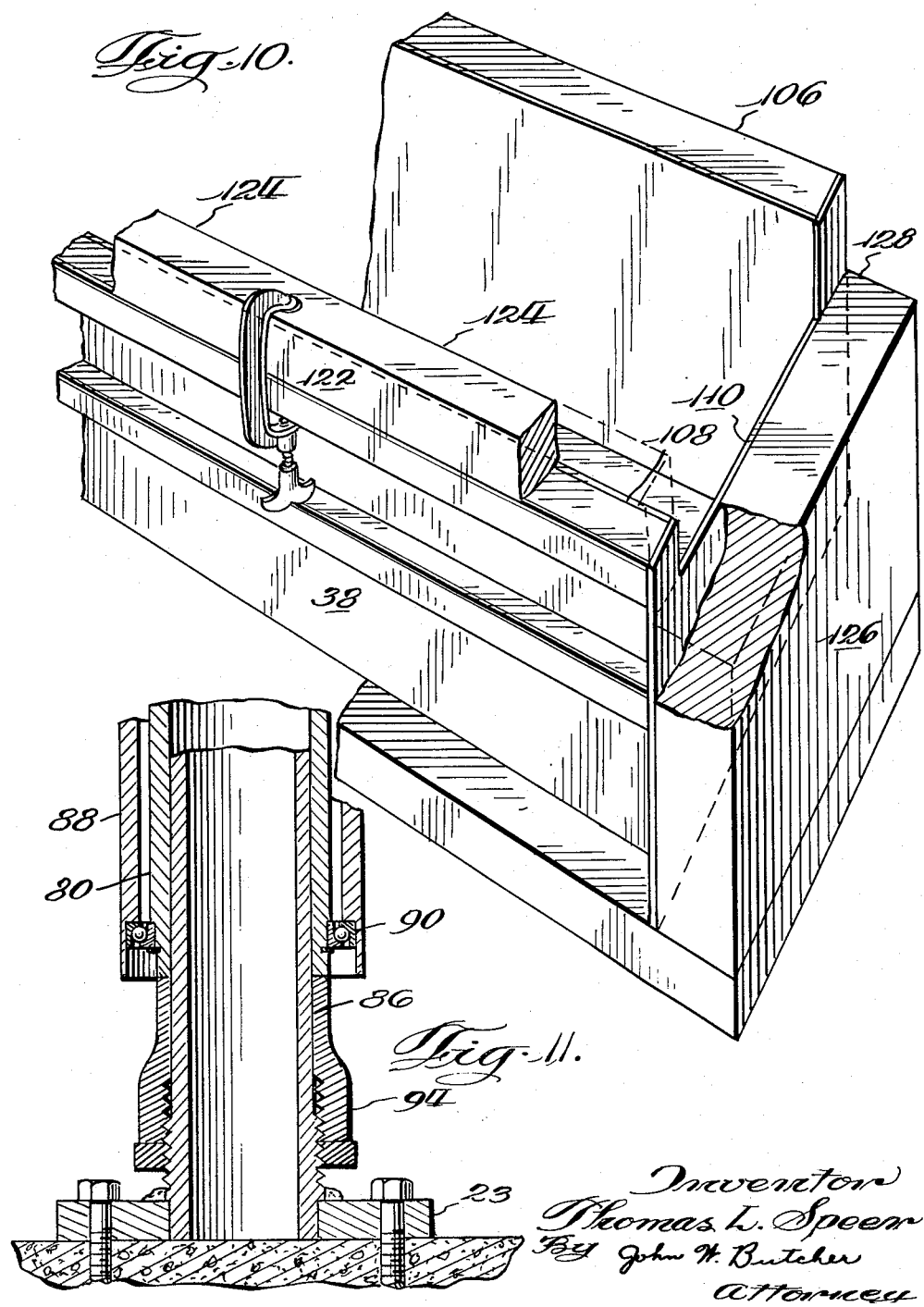

United States Patent Office

3,119,257
Patented Jan. 28, 1964

3,119,257
TRAFFIC SIMULATOR APPARATUS
Thomas L. Speer, Homewood, Ill., assignor to Standard
Oil Company, Chicago, Ill., a corporation of Indiana
Filed Mar. 2, 1960, Ser. No. 12,467
3 Claims. (Cl. 73—146)

This invention relates to a method and to an apparatus for testing paving materials and, more particularly, to a method and to an apparatus for testing paving materials under conditions simulating normal use of said paving materials.

Highway paving materials, under normal operating conditions, are subjected to various forces. Motor vehicles, of necessity, have at least one set of driving wheels which exert tractive forces on the surface of the paving. The remaining wheels do not exert this tractive force but merely roll on the surface of the paving. Occasionally, the paving has other forces applied to the surface thereof such as, for example, lateral skidding forces and longitudinal braking forces. It has been observed that the paving moves or shoves under the action of traffic normally in the direction of the traffic. An accelerating torque appleid to the power wheels of the motor vehicle results in a tractive force rearward the vehicle. This rearward-acting force moves or shoves the paving rearwardly. The rolling action of both the driving wheels and the remaining wheels exerts a force which tends to make the paving surface move forward. When the brakes are applied, the decelerating torque applied to the wheels produces an additional forward-acting force which tends to make the paving surface move forward. The paving may be subjected to lateral forces as a result of the loading factor of an individual wheel. The wheels such as, for example, under a heavily loaded truck exert large vertical forces on the pavement. These vertical forces tend to shove the pavement adjacent the loaded pavement laterally away from the loaded pavement. The actual lateral distortion may depend on the relative position of the wheel with respect to the pavement slab area. For example, this problem is less severe if the wheel is near the center of the pavement as the pavement, in this location, is essentially confined by the surrounding pavement. The problem is somewhat more severe as the wheel position is changed to a point near the edge of the pavement. Here the pavement is not laterally confined.

Briefly, a plurality of elongated paving strips are formed within elongated open-top boxes such that portions of the paving strips extend beyond opposite ends of the open-top boxes. These portions are subsequently removed to form a plurality of paving sections. Paving sections are placed in end-to-end relationship to form a continuous roadbed. A plurality of paving wearing members which are in contact with the continuous roadbed are propelled along the continuous roadbed. A provision is made to force the paving wearing members against the surface of the continuous roadbed with a preselected force. Power may be generated by applying a decelerating torque to at least one of the paving wearing members. This power may be directed to at least one of the remaining paving wearing members to apply an accelerating torque thereto.

An object of this invention is to provide an apparatus for applying forces to a paving material which forces are similar to the forces applied to highway paving materials by vehicle wheels, particularly rubber tires. It is a further object of this invention to provide a method of forming a continuous roadbed from a plurality of paving sections. It is a still further object of this invention to provide an apparatus for testing paving materials wherein a plurality of paving wearing members may be propelled along the surface of a continuous roadbed to simulate the rolling forces exerted by a loaded vehicle upon a roadbed. It is another object of this invention to provide an apparatus for testing paving materials wherein a plurality of paving wearing members may be propelled along the surface of a continuous roadbed while simultaneously applying a decelerating torque to at least one of the paving wearing members and thus generating energy to propel at least another one of the paving wearing members and applying an accelerating torque thereto.

Additional objects will become apparent as the following description which is to be read in connection with the annexed drawing proceeds. In these drawings:

FIGURE 1 is an assembly view of the paving testing apparatus;

FIGURE 2 is a plan view of the apparatus illustrated in FIGURE 1;

FIGURE 3 is a plan view of a sector of a continuous roadbed;

FIGURE 4 is an elevational view, partially in cross section, of the central column assembly;

FIGURE 5 is an enlarged view of the adjustment section of the central column;

FIGURE 6 is a plan view of the paving carriage assembly used to support the individual paving sections;

FIGURE 8 is an elevational view, partially in cross section, which illustrates a preferred means of connecting the paving wearing members to the radially extending arms;

FIGURE 9 is a plan view, partially in cross section, taken along section lines 9—9 of FIGURE 8;

FIGURE 10 is an isometric view of the end portion of the open-top box used to carry individual paving strips; and FIGURE 11 is an enlarged elevational view, partially in cross section, of the lower portion of the central column.

Figure 7:
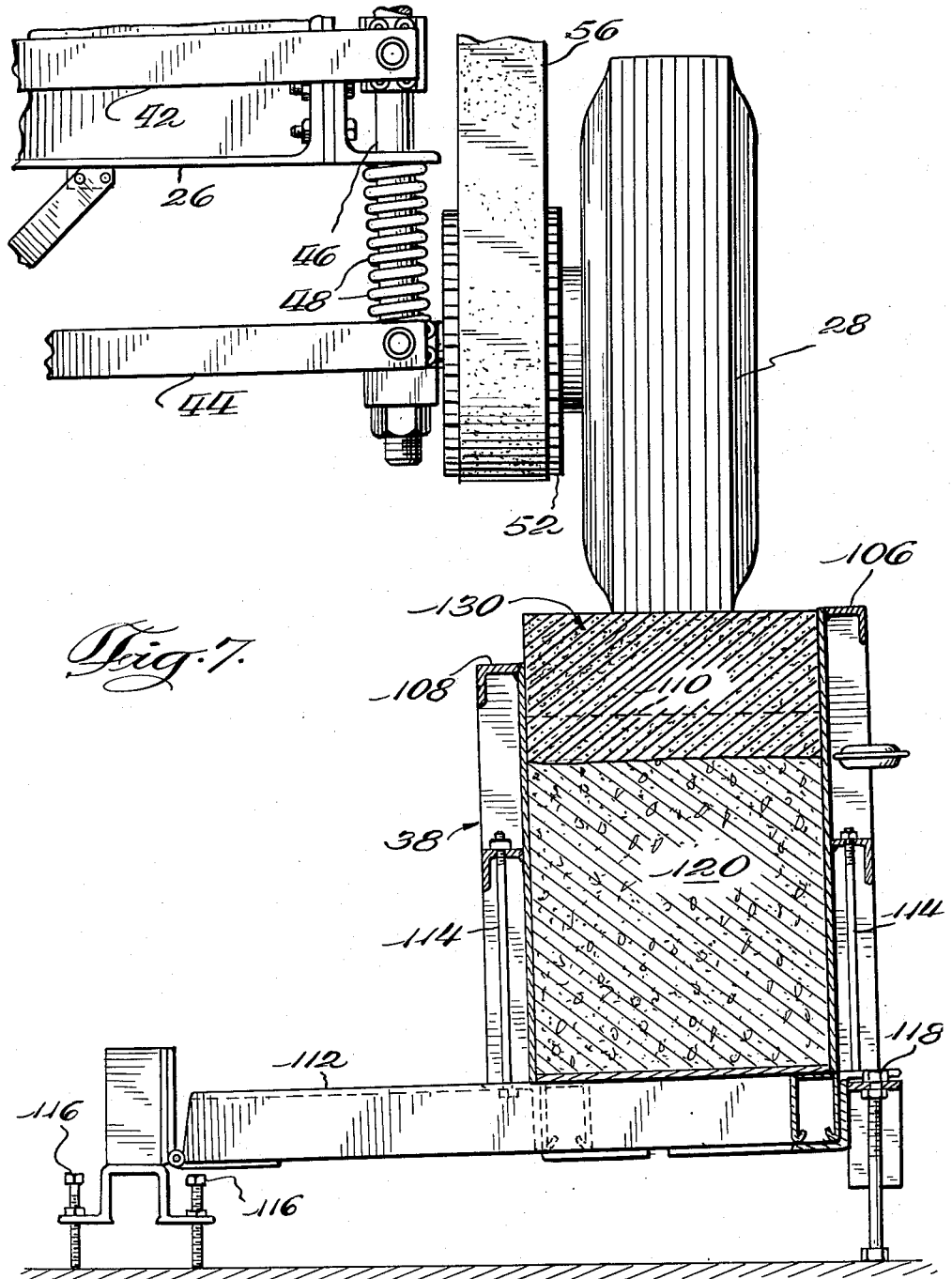
FIGURE 7 is an elevational view, partially in cross section, which illustrates the relative positions of the paving materials and the paving wearing members.

Referring now to FIGURE 1, a central column 20 is anchored to an upper ground plate 22 and a lower ground plate 23 (FIGURE 4). The central column rotatably supports a turntable apparatus 24. The turntable apparatus includes a plurality of radially extending arms 26 which are rotatably supported by the central column 20. A plurality of paving wearing members are rotatably mounted on the radially extending arms. Wheels 28 provided with rubber tires are illustrated as a preferred paving wearing member. The wheels 28 are independently sprung by way of a parallelogram linkage (hereinafter described) to the radially extending arms 26. A central propellent means is attached to the turntable and, as illustrated herein, includes a drive motor 30 which drives a gear reduction box 32 which in turn rotates the central column sprocket 34 and the radially extending arms 26. A plurality of brake means such as, for example, generators G are connected to at least one of the wheels 28. A plurality of power means such as, for example, motors M are connected to at least another one of the wheels 28. A continuous roadbed 36 in contact with the wheels 28 is formed from a plurality of open-top boxes 38 placed in end-to-end relationship. Each of the open-top boxes 38 includes a subgrade material in the lower portion of the open-top box and a paving material which extends upwardly from the subgrade material to a point approximately level with the upper edge of the open-top box.

The parallelogram linkage (FIGURES 8 and 9) utilized to attach the wheels 28 to the radially extending arms 26 includes a fixed arm 40 which has pivotally mounted thereon first arms 42 and second arms 44. A movable arm 46 is pivotally mounted to first arms 42 and second arms 44. A resilient means such as, for example, a coil spring 48 is shackled between the movable arm 46 and the radially extending arm 26 in such a manner that the movable arm 46 of the parallelogram linkage is urged vertically downward. An axle 50 (FIGURE 8) rotatably supports the wheel 28 and the wheel drive gear 52.

The illustrated means of connecting the wheel 28 to the radially extending arm 26 provides a means for rotatably supporting the wheel 28 and simultaneously provides a means for movement of the wheel 28 in a vertical plane. This particular mounting technique results in a uniform distribution of the wheel load from the face of the wheel 28 to the surface of the continuous roadbed 36. The uniform distribution of the wheel load may be maintained under substantially all wheel load conditions.

The wheel drive gear 52 is connected to a drive shaft gear 54 by a timing gear belt 56. The timing gear belt 56 eliminates slippage between the wheel drive gear 52 and the drive shaft gear 54. The drive shaft gear 54 is rotatably mounted within a drive shaft bearing 60 which is fixably supported on the movable arm 46 by the bearing support rod 62. The drive shaft 58 may be connected to the generator G or to the motor M.

A toggle switch 64 (FIGURE 8) is mounted to the radially extending arm 26 by means of plate 66. A toggle arm 68 extends from the toggle switch 64 a predetermined distance below a contact arm 70 which is in vertical alignment therewith. Thus, in the event the movable arm 46 moves vertically downward a distance in excess of the distance between the toggle arm 68 and contact arm 70, the contact arm 70 strikes the toggle arm 68 and actuates the toggle switch 65. The toggle switch 64, when actuated, shuts off the power supplied to the drive motor 30. Thus, the toggle switch 64 is used to shut down the test apparatus in the event of a blowout, a flat tire, or excessive roughening of a paving strip.

The upper anchor stem 72 (FIGURE 4) of the central column 20 is connected to the upper ground plate 22. The upper anchor stem 72 includes a threaded section 74 in the lower end thereof which threaded section 74 engages a mating threaded section of the adjustment collar 76. The lower end of upper anchor stem 72 is fitted with a double-acting hydraulic jack 78. An inner pipe 80 having an upward facing flange 82 is adapted to engage a downward facing flange 84 located on the lower end of the adjustment collar 76. The lower end of inner pipe 80 slidably fits over the lower anchor stem 86. An outer pipe 88 is rotatably mounted about inner pipe 80 by way of a lower bearing 90 and an upper thrust bearing 92. A threaded sleeve 94 is threadably supported on the lower anchor stem 86 and engages the lower end of the inner pipe 80 to limit the vertical movement of the inner pipe 80 with respect to the lower anchor stem 86. A plunger 96 extends from the double acting cylinder 78 and is fixably attached to the inner pipe 80. The radially extending arms 26 are fixed to the outer pipe 88 by any conventional means such as, for example, by welds 98. The central column sprocket 34 is fixably attached to the outer pipe 88 by any conventional means such as, for example, sprocket welds 100.

The central column assembly, as hereinabove disclosed, provides an assembly for rotatably supporting the turntable apparatus while simultaneously permitting the turntable apparatus to be positioned in any one of a number of different vertical positions. The central column assembly, as disclosed herein, utilizes a "prestressed" column. The term, "prestressed," as used herein, is defined as a column which, when in operation, is capable of exerting an upward-acting force against the upper ground plate 22 and exerting a downward-acting force against the lower ground plate 23. This "prestressed" column minimizes rotational vibration forces.

The radially extending arms 26 are vertically adjustable with the central column 20. The adjustment is made as follows: The lock nut 102 (FIGURE 5) is released from engagement with the upper end of adjustment collar 76. The threaded sleeve 94 (FIGURE 4) is released from engagement with the lower end of the pipe 80. The flange bolts 104 (FIGURE 5) are removed from the downward facing flange 84 and the upper facing flange 82 and the adjustment collar 76 is rotated to a position wherein the downward facing flange 84 is parted from the upward facing flange 82. The double-acting hydraulic jack 78 is actuated to raise or to lower the turntable apparatus to the desired vertical position. The double-acting hydraulic jack 78 is maintained at this position and the adjustment collar 76 is rotated to place the downward facing flange 84 in contact with the upward facing flange 82 in such a position the bolt holes in the downward facing flange 84 are aligned with the bolt holes in the upward facing flange 82. The flange bolts 104 are subsequently placed into position and tightened. The lock nut 102 is rotated until it engages the upper end of the adjustment collar 76. The threaded sleeve 94 is rotated to engage the lower end of inner pipe 80 and then is rotated further to apply an upward-acting force to the inner pipe 80.

The open-top box 38 (FIGURE 7), used to hold the paving material, has an outer upper edge 106 which is slightly higher than the inner upper edge 108. The end upper edges 110 are slightly lower than both the outer upper edge 106 and inner upper edge 108. The open-top boxes 38 are removably connected to a carriage support 112 by anchor bolts 114. Inner height adjustment bolts 116 and outer height adjustment bolts 118 (FIGURE 6) are placed on the carriage support 112 to adjust the respective corners of the open-top box. The disclosed means of adjusting the carriage support 112 provides a means of positioning a plurality of paving sections together in an end-to-end relationship to form a continuous roadbed having a smooth surface regardless of the degree of wear of an individual paving section. For example, a new paving section may be placed intermediate two worn paving sections such that the upper surface of the new paving section is level with the upper surface of the adjacent worn paving sections. This particular feature minimizes vertical shock vibrations.

The paving section is formed within the open-top box 38 by placing and tamping a subgrade material 120 (FIGURE 7) in the lower portion of the open-top box 38. The subgrade material preferably extends upward to a level slightly below the end upper edges 110. An inner confinement bar 122 (FIGURE 10) is clamped to the inner upper edge 108 such that the top edge 124 of the inner confinement bar 122 is substantially level with the outer upper edge 106. A support assembly 126 is placed adjacent each end of the open-top box 38 such that the upper surface 128 of the support assembly 126 is substantially level with the end upper edges 110 of the open-top box 38. A paving material 130 (FIGURE 7) is formed in the open-top box 38 and extends upward from the subgrade material to a point approximately level with the outer upper edge 106 and the top edge 124 of the inner confinement bar 122. The paving material preferably extends beyond each end of the open-top box such that the paving material is supported by the support assembly 126. After the paving material has been placed in the open-top box, as hereinabove described, the end portions of the paving material are sliced away such that the end of the paving is even with the end of the open-top box. The inner confinement bar 122 may be removed to allow lateral freedom of movement on the inner lateral edge of the continuous roadbed. A plurality of these individual paving sections may be placed in end-to-end relationship to form a continuous roadbed.

In operation, the individual paving sections are placed in an end-to-end relationship to form a continuous circular roadbed. The turntable assembly is positioned vertically with respect to the central column 20 by adjusting the inner pipe 80 with respect to the upper anchor stem 72, as hereinabove described, to give the desired wheel loading on the surface of the roadbed. The drive motor 30 is energized and drives gear reduction box 32 and central column sprocket 34 to rotate the turntable apparatus at a predetermined rotational speed. Majority of wear experienced with conventional paving is normally a result of rolling forces. Power torque is normally applied to half or less than half of the wheels of the vehicle. Power torque is not normally applied to the power wheels continuously but rather on an intermittent program such as, for example, when starting and when climbing a grade. Therefore, it is preferable to provide a test apparatus wherein a large proportion of the wear of the test roadbed is a result of rolling forces. In the event it is desired to test the effect of tractive forces and braking forces, a D.C. current is supplied through a slip ring assembly on the central column 20 (not shown) to the field winding of the generator G. The excitation of the field winding results in the application of a decelerating torque to the wheel 28. The energy generated as a result of this decelerating torque is fed directly from the generators G to the motors M and results in the application of an accelerating torque to the wheels 28. The amount of decelerating torque applied is directly proportional to the account of D.C. current supplied to the field winding of the generator G. The deceleration torque may be applied continuously, intermittently, or on a program arrangement such as, for example, wherein the forces are applied as the wheel passes over at a pre-selected roadbed section.

While in the foregoing there have been shown and described preferred embodiments of the method and the apparatus of the present invention, it is to be understood that minor changes in the steps and operations involved, and in the details of construction, combination and arrangement of parts may be resorted to without departing from the spirit and the scope of the invention. Manifestly, the construction as shown and described is capable of some additional modification and such modification as may be construed to follow within the scope and meaning of the appended claims is also considered to be within the spirit and intent of the invention.

Thus having described the invention, what is claimed is:

1. A continuous roadbed for testing paving materials comprising a plurality of paving sections placed in end-to-end relationships, each of said paving sections comprising an open-top box having an upper edge, a subgrade material in the lower portion of said open-top box, a paving material extending upward from said subgrade material to a point approximately level with said upper edge, and adjusting means positioned beneath each box adjacent each corner thereof to adjust the height of said box such that the upper surface of each of said paving sections is level with the upper surface of adjacent paving sections.

2. An apparatus for simulating traffic conditions which apparatus comprises a central column, a plurality of radially extending arms rotatably supported by said central column, said arms being vertically adjustable in respect to said central column, a parallelogram linkage attached to each of said arms, a wheel rotatably connected to each parallelogram linkage, a central propellent means attached to said arms and adapted to rotate said arms at a predetermined rotational speed, a brake means connected to at least one of said wheels, a power means connected to at least another one of said wheels, said brake means being adapted to apply a decelerating torque to said wheel on which it is mounted and to generate power and being connected to said power means to apply an accelerating torque thereto, carriage support means, a continuous roadbed positioned beneath and in wearing contact with said wheels, said roadbed comprising a plurality of paving sections placed in end-to-end relationship and mounted on said carriage support means, each of said paving sections comprising an open-top box having an upper edge, a subgrade material in the lower portion of said box, a paving material extending upwardly from said subgrade material to a point approximately level with said upper edge, and adjusting means positioned beneath and vertically supporting said carriage support at points adjacent the corners of said box to independently adjust the height of each of said paving sections to form a continuous roadbed having a substantially smooth surface.

3. An apparatus for testing paving materials comprising a central column, a plurality of radially extending arms rotatably supported by and vertically adjustable with respect to said central column, a wheel rotatably mounted on each of said radially extending arms, a central propellent means attached to said radially extending arms adapted to rotate said radially extending arms, a brake means connected to at least one of said wheels adapted to apply a decelerating torque to said wheel and generate power, a power means connected to at least one of the remaining wheels and connected to said brake means adapted to apply an accelerating torque to said remaining wheel, and a continuous roadbed positioned beneath and in wearing contact with said wheels, said roadbed comprising a plurality of paving sections placed in end to end relationship and containing paving material to be tested, said wheel connected to said radially extending arm upon which it is mounted through a vertically movable arm, said vertically movable arm being provided with a resilient means to urge said wheel vertically downward, and switch means actuated by said movable arm to shut off power supplied to said central propellant means when said movable arm moves vertically downward in excess of a pre-selected distance.

References Cited in the file of this patent

UNITED STATES PATENTS

| | | |
|---|---|---|
| 955,250 | Carney et al. | Apr. 19, 1910 |
| 973,858 | Cuenot | Oct. 25, 1910 |
| 1,638,111 | Coffin | Aug. 9, 1927 |
| 2,131,979 | Seidl | Oct. 4, 1938 |
| 2,920,481 | Hulswit et al. | Jan. 12, 1960 |

OTHER REFERENCES

"Round and Round," Scientific American, April 1937, pages 246–248.